3,756,997
THERMOPLASTIC COMPOSITIONS
Ursula Eichers, Recklinghausen, and Otto Hahmann, Heinz-Hermann Meyer, Konrad Rombusch, and Manfred Rossbach, Marl, Germany, assignors to Chemische Werke Huels Aktiengesellschaft, Marl, Germany
No Drawing. Filed Jan. 21, 1971, Ser. No. 108,589
Claims priority, application Germany, Jan. 21, 1970, P 20 02 489.9
Int. Cl. C08f 29/02, 45/00; C08g 41/02
U.S. Cl. 260—88.2 S                           14 Claims

ABSTRACT OF THE DISCLOSURE

Crystalline polyolefin and polyamide compositions nucleated with sulfonic acids and salts thereof of the formula

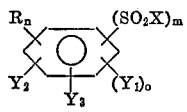

wherein X is —OH, —OMe or —NHR' in which Me is an equivalent of a metal, preferably alkali metal, and R' is aryl, preferably phenyl, or hydrogen; $m$ is 1 to 2; R is alkyl of 1–4 carbon atoms, phenyl or hydrogen; $n$ is 0 to 2; $Y_1$ is amino alkylamino or arylamino; $o$ is 1 to 2; $Y_2$ is —OH or —OMe in which Me has the value given above, halo or hydrogen, and $Y_3$ is a nitro, carboxyl, or carboxylate group, or hydrogen, have lowered crystallization half-times and a more uniform spherulite structure, which results in more rapid mold release during cyclic operating procedures; improved mechanical properties; and improved transparency.

BACKGROUND OF THE INVENTION

This invention relates to crystallizable and crystalline thermoplastic polyolefin and polyamide compositions, more preferably nucleated thermoplastic compositions.

It is known that certain polymers are crystallizable, i.e. form partially crystalline solid bodies during cooling of the melt. A prerequisite for the crystallization is a substantially completely regular structure of the polymer chain. Among the partially crystalline polymers are, for example, polyesters, polyvinylidene chloride, polytetrafluoroethylenes, polyamides and polyolefins, especially polyethylenes and the higher poly-α-olefins. Copolymers are also capable of crystallization if at least one of the monomers, which is crystallizable as a homopolymer, is present in sufficient block length.

The crystalline proportion of partially crystalline polymers can vary within wide limits, but generally does not exceed 80–90%. The basic building block of the crystalline zones is the unit cell, the form and dimensions of which are dependent on the structure of the chain and on the intermolecular force. Of much greater importance to the mechanical properties is the over-all macrocrystalline structure, i.e., the manner in which the unit cells are aggregated into larger zones. For example, such zones, which often are visible as lamellae or spherulites, exhibit in polypropylene films a profound influence on the transparency and the tensile strength. It is likewise known that the tensibility of fibers and filaments depends on the structure and arrangement of the lamellar zones.

A number of measures are known which make it possible to influence this crystalline structure. Among such measures are tempering, i.e., the thermal secondary treatment of finished molded final products; the quenching of the molded article, i.e., the accelerated cooling thereof; and finally also any type of mechanical aftertreatment resulting in an orientation of the molecular chains.

However, a particularly advantageous method has proved to be an accelerated crystallization obtained by direct interference with the crystallizing process, i.e., by the addition of nucleators. This measure provides a number of advantages, inter alia:

(1) More rapid mold release during cyclic operating procedures;
(2) Improved mechanical properties; and
(3) Improved transparency.

It is particularly desired, especially in film, filament, and fiber field, to have nucleating agents available which exhibit a maximum effect at a minimum concentration, i.e., which, on the one hand, accomplish the desired acceleration in crystallization particularly rapidly without themselves appearing in recognizable form as additives which could impair the mechanical, optical, and other properties of the polymers.

Thus, it is known from U.S. Pats. Nos. 2,991,264; 3,118,847; 3,207,735; 3,207,736; 3,207,737; 3,207,738; and 3,207,739; as well as 3,367,926; and from Appl. Pol. Sci. 11, 673 (1967) that certain additions of foreign substances, added to the polymer melt in finely divided form, can serve as nucleating agents for the subsequent crystallization of the polymers during cooling and favorably influence the crystalline structure.

Substances which exert a nucleating action on the crystallization of α-olefins include inorganic compounds, usually metallic salts, as well as organic compounds, including aromatic or aliphatic mono- and polycarboxylic acids and the amino and nitro derivatives thereof and salts thereof, and also certain sulfo compounds. Such compounds are described in detail, especially in U.S. Pat. No. 3,367,926. Of such substances, unsubstituted benzenecarboxylic acid salts are among the compounds exhibiting greatest effectiveness (Example 4), whereas the amino derivatives thereof exhibit the lowest effect among the number of 145 tested compounds.

This invention is directed to polyamides and polyolefins containing readily available, highly effective nucleating agents.

SUMMARY OF THE INVENTION

The crystallizable and crystalline thermoplastic polyolefin and polyamide compositions of this invention comprise a nucleating effective amount of an aromatic sulfonic acid, or salt thereof, of the formula

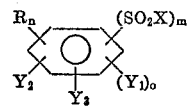

wherein X is —OH, —OMe or —NHR' in which Me is an equivalent of a metal, preferably alkali metal, and R' is aryl, preferably phenyl, or hydrogen; $m$ is 1 to 2; R is alkyl of 1–4 carbon atoms, phenyl or hydrogen; $n$ is 0 to 2; $Y_1$ is amino alkylamino or arylamino; $o$ is 1 to 2; $Y_2$ is —OH or —OMe in which Me has the value given above, halo or hydrogen, and $Y_3$ is a nitro, carboxyl, or carboxylate group, or hydrogen.

DETAILED DISCUSSION

It is surprising that the amino-substituted compounds of the compositions of this invention are highly effective nucleating agents because it appears from U.S. Pat. No. 3,367,926 that the introduction of an amino group into the aromatic system reduces effectiveness considerably. Consequently, it would be expected that the low effectiveness of aromatic sulfonic acids and the salts thereof, would be reduced even more by the introduction of an amino group. Surprisingly, the opposite is the case. Not only is effectiveness not reduced, it is significantly increased. The additives in all case result in the formation of a uniform spherulite structure.

Examples of polyolefins whose crystallization times are reduced by the nucleating activity of the additives as defined herein are the normally solid crystallizable polymers of α-monoolefins, preferably those of olefins containing 2 to 8 carbon atoms, e.g., low-pressure and high-pressure polyethylene, polypropylene, polybutene-(1), and polypentene-(1). Others are 4-methyl-1-pentene, and 1-hexene, crystalline copolymers of propylene with ethylene, 1-butene and the like, and crystalline polystyrene. Particularly desirable improvements are obtained, for example, in block polymers, such as those consisting predominantly of isotactic polypropylene having small amounts of ethylene, e.g., between 1 and 10 percent, copolymerized therewith by block polymerization, isotactic polymers of α-monoolefins having at least 3 and up to 8 carbon atoms per molecule, and polymers of α-monoolefins having from 2 to 4 carbon atoms.

Examples of normally solid crystallizable polyamides are the known moldable, extrudable, film forming, fiber forming and/or filament forming nylons, e.g. nylon 12, nylon 66, nylon 11, and nylon 6.

It will be apparent that the particular structure of the nylon or polyolefin is not critical as long as it is normally solid and crystallizable from a melt with a crystallization half-time which is long enough so as to be improved by nucleation.

In the above formula Me can be, for example, Ca, Mg, Zn, Cu, Li, or preferably Na or K, and R' can be any carbocyclic aromatic group, e.g., phenyl, naphthyl, p-diphenyl, tolyl, xylyl, and alkyl can be, e.g., methyl, ethyl, n-propyl, isopropyl and butyl. When R is phenyl, the benzene ring is preferably unsubstituted. However, equivalents are compounds in which the phenyl group bears a simple substituent, e.g., lower-alkyl, including methyl, lower-alkoxy, including methoxy, halo, including chloro, carboxy, carbalkoxy, including carbomethoxy, amino, lower-alkyl-amino, including methylamino, di-lower-alkylamino, including dimethylamino, amido, carbamide, sulfate, sulfonyloxy, etc.

When $Y_1$ is alkylamino, the alkyl group can be any alkyl group, e.g., methyl, octyl, dodecyl, but preferably is lower-alkyl of 1-4 carbon atoms, and when $Y_1$ is arylamino, the aryl group can be any carbocyclic aromatic group as defined above but preferably is phenyl, substituted or unsubstituted. When $Y_3$ is a carboxylate group, the group is preferably carbo-lower-alkoxy, e.g., carbomethoxy, carboethoxy, etc.

Preferred as additives of this invention are sulfonic acids and metal salts thereof of the formula

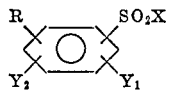

wherein X is —OH or —OMe in which Me is an equivalent of a metal, preferably an alkali metal, especially sodium; R is methyl, which preferably is in an m-position with respect to the sulfo group, or hydrogen; $Y_1$ is an amino group positioned ortho or meta to the sulfo group; $Y_2$ is a halo group, preferably chlorine, or hydrogen.

These preferred additives are aminobenzenemonosulfonic acids and the sodium salts thereof, especially those having the amino group in the 2-position or 3-position, preferably the former, especially those additionally containing a chloro and/or methyl group, with the methyl group preferably in the 3-position or 5-position with respect to the sulfo group. The presence of a hydroxy group instead of a chloro group usually lowers effectiveness. A nitro or carboxyl group in the molecule usually reduces activity and increases effectiveness only rarely.

Examples of preferred additives are: 3- and 4-aminobenzenesulfonic acid, 3- and 4-aminobenzenesulfonic acid amide, the potassium salt of 3-amino - 4 - carboxy-5-chlorobenzenesulfonic acid, 3-amino - 4 - hydroxy - 5-carboxybenzenesulfonic acid, 3-amino-5-methylbenzenesulfonic acid, 3-methyl - 4 - amino - 5 - chlorobenzenesulfonic acid, the sodium salt of 3-amino-5-carboxy-6-hydroxybenzenesulfonic acid, the sodium salt of 3-methyl-4-aminobenzenesulfonic acid, 4,4' - diaminodiphenylsulfonic acid-(3), 3-amino - 6 - phenylaminobenzenesulfonic acid, 3-amino - 4 - chlorobenzene-sulfonic acid, the sodium salt of 3-amino-6-chlorobenzenesulfonic acid, and 2,6-diaminobenzenesulfonic acid.

Examples of especially preferred additives are 2-amino - 5 - chlorobenzenesulfonic acid, the sodium salt of 2 - amino - 4 - chloro - 5 - methylbenzenesulfonic acid, 2 - amino - 4 - methyl - 5 - chlorobenzenesulfonic acid, the sodium salt of 2-amino - 5 - methylbenzenesulfonic acid, 2-aminobenzenesulfonic acid, the sodium salt of 2-amino - 5 - nitrobenzenesulfonic acid, the potassium salt of 2-amino - 4 - carboxy - 5 - chlorobenzenesulfonic acid, the lithium salt of 2-amino - 3 - methyl - 5 - chlorobenzenesulfonic acid, and the sodium salt of 2-amino-6-methyl-benzenesulfonic acid.

The nucleating additives of this invention are usually employed in concentrations of 0.005–2%, preferably 0.05–1% by weight, most preferably about 0.5% by weight, based on the polyolefin or polyamide. However, favorable effects can also result employing concentrations above or below these limits.

Although the additives can be incorporated into the polyolefin or polyamide during the polymerization or polycondensation, generally it is advantageous and preferred to add the high-melting additives of the present invention, most preferably in an extremely finely divided form, to the polyamide or polyolefin prior to the processing thereof, e.g., prior to granulation. The additives can also be incorporated by other processing methods known in the art, for example in the melt, to the granulated or powdered polymer or in the heat-plasticized state by thermal plasticizing on masticating rolls.

Quantitative measurements of the degree of crystallinity of partially crystalline polymers can be conducted, inter alia, with the aid of X-ray diffraction or differential thermoanalysis. Examinations of the spherulite structure can be conducted by light microscope or electron microscope. In case of oriented crystallite structures (for example, in case of elongated fibers or films), an examination of the texture by X-ray analysis is suitable.

Rates of crystallization can be measured either isothermically or under temperature-programmed cooling, by differential thermoanalysis or dilatometry.

Along with an accelerated crystallization rate, more uniform spherulite structures can be observed under the light microscope with polymers containing an additive of this invention. In this connection, it is especially surprising that due to the action of the nucleating agent, the spherulites become markedly smaller, i.e., formation of coarse crystal structures is strongly suppressed or completely avoided.

The improvement in the properties of partially crystalline synthetic polymers produced in accordance with the process of the invention include increased transparency, as well as improved tensile properties of fibers and films. This improved tensile behavior permits a substantially increased take-up rate in the stretching (orientation) step, which can be increased, for example, by three to five times, compared to the same polymer lacking a nucleating agent. This results in a considerable increase in output, which is a very important factor for the processor. For the production of films, bands, stretched tapes, split yarns, slit yarns, tubes, or similar shapes, a crystalline linear polyolefin or polyefin copolymer provided with the above-mentioned crystallization nucleators is plasticized in an extruder and extruded, e.g., through a ring or flat die. During this process, a bubble is drawn out of the die, usually in the upward direction in a vertical orientation. The extrusion can, of course, be conducted from the top toward the bottom or in a horizontal direction. Alternatively, the amorphous mass is sprayed onto rolls or into a water bath and withdrawn as a flat film.

The thus-produced blown or flat films, or the sheets cut into strips of any desired width are either immediately conducted into a stretching machine or reeled-up onto a roll and thereafter oriented by stretching in a separate process, usually in a monoaxial manner. The polymer can be heated in a gaseous medium, usually air, or in a liquid medium, or by means of heated stretching rollers. Conducting the stretching process by means of heated rollers has the advantage that a transverse stretching takes place simultaneously with the monoaxial orientation, thus contributing significantly to transverse strength, if such property is desired. The crystalline flat articles are stretched by a multiple of their initial length in the thermoelastic range. With the same degree of stretching, the stretching rate of the films or bands can be increased, by the preceding controlled crystallization process, by a multiple of the original value, so that higher wind-up or reeling speeds and thus higher production efficiencies result.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A low-pressure polyethylene copolymer with 2% of polybutene-(1) is extruded on a blown-film extrusion machine of a conventional construction vertically from the bottom toward the top into a tube with a blow-up ratio of 1:1,2 and a take-off speed of 15 m./min., and then laid flat and wound up. The thickness of the film is 60$\mu$. The doubled, laid-flat film is later cut into strips of a width of 10 mm. while being taken off the roll and conducted into a stretching unit consisting essentially of two stretching roll (godet) racks and a hot-air duct. With a stretching ratio of 1:7 and an air temperature of 100–110° C., stretching rates of 60–80 m./min. can be achieved, considering a uniform reduction of the width and thickness of the bands which are essentially proportional to the square root of the stretching ratio. With higher stretching rates, rupturing and variations in the dimensions of the band are incurred. The variations in dimensions, which are manifested in the manner of an irregular wavy line along the stretched film bands, can be slightly reduced by increasing the stretching ratio, which, however, can only be attained at the expense of possible production stoppage.

Another portion of the same polyethylene is intimately admixed with 0.5% by weight of the sodium salt of 2-amino-4-chloro-5-methylbenzenesulfonic acid, or 2-amino-5-chlorobenzenesulfonic acid and the polyethylene additive mixture is extruded into blown film in the same manner. During the stretching step, production rates of more than 200 m./min. are achieved, without the occurrence of the above-mentioned dimensional variations and ruptures, or breaks.

Low-pressure polyethylene homopolymer, crystalline polypropylene, polybutene-(1), and nylon, e.g., nylon-6, 11, 12 or 66, exhibit a similar behaviour when provided with the same additives.

EXAMPLES 2–49

The table below contains the data obtained with a variety of sulfonic acids and the salts thereof evaluated for their crystallization-accelerating effect in a dilatometric experiment. The nucleating additives were added in proportions of 0.005–2% by weight, inter alia, to a commercially available Ziegler polyethylene in a high-speed mixer, and the powdery mixtures were then homogenized on a hot roll for about 1 minute at 186° C. After melting at 185° C., the isothermic decrease in volume was observed at 126° C. during about a 24 hour period. With other types of polyolefins, and in case of polyamides, different temperatures are required. The half-times listed in the table are the periods after which one-half of the crystallizable material is present in the crystalline form.

| | | Half-time crystallization (min.) | Temperature (° C.) |
|---|---|---|---|
| 2 | Pure LP-polyethylene (M.W. about 50,000, softening point 118° C., density 0.95) plus: | 180 | 126 |
| 3 | 0.5% by wt. 2-aminobenzenesulfonic acid | 118 | 126 |
| 4 | 0.5% by wt. 3-aminobenzenesulfonic acid | 135 | 126 |
| 5 | 0.5% by wt. 2-amino-5-chlorobenzenesulfonic acid | 18 | 126 |
| 6 | 0.005% by wt. 2-amino-5-chlorobenzenesulfonic acid | 142 | 126 |
| 7 | 0.05% by wt. 2-amino-5-chlorobenzenesulfonic acid | 82 | 126 |
| 8 | 1.0% by wt. 2-amino-5-chlorobenzenesulfonic acid | 58 | 126 |
| 9 | 2.0% by wt. 2-amino-5-chlorobenzenesulfonic acid | 52 | 126 |
| 10 | 0.5% by wt. 2-amino-4-chloro-5-methylbenzesulfonic acid, sodium salt | 55 | 126 |
| 11 | 0.5% by wt. 2-amino-4-methyl-5-chlorobenzenesulfonic acid | 90 | 126 |
| 12 | 0.5% by wt. 2-amino-6-methylbenzenesulfonic acid, sodium salt | 76 | 126 |
| 13 | 0.5% by wt. 2-amino-4-carboxy-5-chlorobenzenesulfonic acid, potassium | 100 | 126 |
| 14 | 0.5% by wt. 2-amino-5-nitrobenzenesulfonic acid | 78 | 126 |
| 15 | 0.5% by wt. 3-amino-4-chlorobenzenesulfonic acid | 72 | 126 |
| 06 | 0.5% by wt. 3-amino-6-chlorobenzenesulfonic acid, sodium salt | 72 | 126 |
| 17 | 0.5% by wt. 3-amino-6-phenylaminobenzenesulfonic acid | 96 | 126 |
| 18 | 0.5% by wt. 3-amino-6-methylbenzenesulfonic acid | 98 | 126 |
| 19 | 0.5% by wt. 4-aminobenzenesulfonic acid amide | 80 | 126 |
| 20 | 0.5% by wt. 2-amino-4-hydroxybenzenesulfonic acid | 82 | 126 |
| 21 | 0.5% by wt. 4,4'-diaminodiphenylsulfonic acid-(3) | 125 | 126 |
| 22 | 0.5% by wt. 4-amino-3-methylbenzenesulfonic acid | 122 | 126 |
| 23 | 0.5% by wt. 4-aminobenzenesulfonic acid | 98 | 126 |

For comparison

| | | | |
|---|---|---|---|
| 24 | 0.5% by wt. 2-hydroxy-5-nitrobenzenesulfonic acid, disodium salt | 140 | 126 |
| 25 | 0.5% by wt. benzenesulfonic acid amide | 150 | 126 |
| 26 | 0.5% by wt. benzenesulfonic acid | 170 | 126 |
| 27 | 0.5% by wt. benzenedisulfonic acid-(1,3) | 165 | 126 |
| 28 | 0.5% by wt. 3-aminophenol | 200 | 126 |
| 29 | 0.5% by wt. 2-acetylaminophenol | 215 | 126 |
| 30 | 0.5% by wt. 4-acetylaminophenol | 180 | 126 |
| 31 | 0.5% by wt. 2-amino-4-nitrophenol | 200 | 126 |
| 32 | 0.5% by wt. 2-aminobenzoic acid | 155 | 126 |
| 33 | 0.5% by wt. 4-aminobenzoic acid | 165 | 126 |
| 34 | 0.5% by wt. 3-amino-o-benzenedicarboxylic acid | 145 | 126 |
| 35 | 0.5% by wt. 3-amino-4-chlorobenzoic acid | 150 | 126 |
| 36 | 0.5% by wt. 2-amino-4-nitrobenzoic acid | 145 | 126 |
| 37 | 0.5% by wt. 4-hydroxybenzoic acid | 130 | 126 |
| 38 | 0.5% by wt. 3,4-dichlorobenzoic acid | 145 | 126 |
| 39 | 0.5% by wt. benzoic acid | 95 | 126 |
| 40 | Pure polypropylene (M.W. about 300,000, softening point 146° C.) plus | 2,000 | 145 |
| 41 | 0.5% by wt. 2-amino-5-chlorobenzenesulfonic acid | 120 | 145 |

TABLE—Continued

| | | Half-time crystallization (min.) | Temperature (° C.) |
|---|---|---|---|
| 42 | 0.5% by wt. 2-amino-4-methyl-5-chlorobenzenesulfonic acid | 48 | 145 |
| 43 | 0.5% by wt. 2-amino-6-methylbenzenesulfonic acid, sodium salt | 80 | 145 |
| 44 | Pure polybutene-(1) (M.W. about 1,500,000, softening point 123° C.) | 200 | 104 |
| | plus | | |
| 45 | 0.5% by wt. 2-amino-5-chlorobenzenesulfonic acid | 44 | 104 |
| 46 | 0.5% by wt. 2-amino-4-methyl-5-chlorobenzenesulfonic acid | 28 | 104 |
| 47 | 0.5% by wt. 2-amino-6-methylbenzenesulfonic acid, sodium salt | 28 | 104 |
| 48 | Pure polyamide 12 [nylon 12] | 41 | 168 |
| | plus | | |
| 49 | 0.5% by wt. 2-amino-4-chloro-5-methylbenzenesulfonic acid, sodium salt | 21 | 168 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A crystallizable thermoplastic polyolefin or polyamide composition containing a nucleating effective amount of an additive of the formula

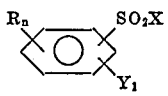

wherein X is —OH or —OMe in which Me is an alkali metal; R is alkyl of 1–4 carbon atoms, phenyl, —OH, —OMe wherein Me has the value given above, halo or a nitro, carboxyl or carboxylate group; $n$ is 1 or 2; and $Y_1$ is $NH_2$.

2. A crystallizable thermoplastic polyolefin composition according to claim 1, wherein the amino group is positioned ortho or meta to the sulfo group.

3. A thermoplastic composition according to claim 2 wherein the polyolefin is a polyethylene.

4. A thermoplastic composition according to claim 2 wherein the polyolefin is a low-pressure co-polymer of ethylene and 2% butene.

5. A thermoplastic composition according to claim 2 wherein the amino group is ortho to the sulfo group.

6. A thermoplastic composition according to claim 5 wherein R is Cl.

7. A thermoplastic composition according to claim 2 wherein X is OH.

8. A thermoplastic composition according to claim 1 wherein the additive is selected from the group consisting of 2-amino-5-chlorobenzenesulfonic acid and the sodium salt of 2-amino-4-chloro-5-methylbenzenesulfonic acid.

9. A thermoplastic composition according to claim 8 wherein the additive is 2-amino-5-chlorobenzenesulfonic acid.

10. A thermoplastic composition according to claim 8 wherein the additive is the sodium salt of 2-amino-4-chloro-5-methyl-benzenesulfonic acid.

11. A thermoplastic composition according to claim 2 containing 0.005–2% by weight of the additive.

12. A thermoplastic composition according to claim 11 containing 0.05–1.0% by weight of the additive.

13. A thermoplastic composition according to claim 12 containing about 0.5% by weight of the additive.

14. A thermoplastic composition according to claim 11 wherein the additive is 2-amino-5-chlorobenzenesulfonic acid.

References Cited
UNITED STATES PATENTS 3,367,926   2/1968   Voeks _____ 260—93.7
3,327,021   6/1967   Binsberger _____ 260—93.7

OTHER REFERENCES

Beck, Jour. Applied Poly. Sci., vol. 11, pp. 673–685 (1967).

JOSEPH L. SCHOFER, Primary Examiner

E. J. SMITH, Assistant Examiner

U.S. Cl. X.R.

260—78 S, 78 SC, 93.5 A, 93.7, 94.9 GB, 878 B, DIG 35